(12) United States Patent
Kwan et al.

(10) Patent No.: US 10,349,366 B2
(45) Date of Patent: Jul. 9, 2019

(54) TOPOLOGY FOR A WIRELESS MODULAR NETWORK

(71) Applicants: Dennis Ching Chung Kwan, San Diego, CA (US); Suresh Kumar Singamsetty, Aliso Viejo, CA (US)

(72) Inventors: Dennis Ching Chung Kwan, San Diego, CA (US); Suresh Kumar Singamsetty, Aliso Viejo, CA (US)

(73) Assignee: WISILICA INC., Laguna Hills, CA (US)

(*) Notice: Subject to any disclaimer, the term of this patent is extended or adjusted under 35 U.S.C. 154(b) by 0 days.

(21) Appl. No.: 14/135,595

(22) Filed: Dec. 20, 2013

(65) Prior Publication Data

US 2019/0014549 A1     Jan. 10, 2019

(51) Int. Cl.
*H04W 56/00* (2009.01)
*H04W 4/38* (2018.01)
*H04W 16/18* (2009.01)

(52) U.S. Cl.
CPC ......... *H04W 56/0015* (2013.01); *H04W 4/38* (2018.02); *H04W 16/18* (2013.01); *H04W 56/004* (2013.01); *H04W 56/006* (2013.01)

(58) Field of Classification Search
CPC ... H04W 56/0015; H04W 4/38; H04W 16/18; H04W 56/004; H04W 56/006
See application file for complete search history.

(56) References Cited

U.S. PATENT DOCUMENTS

| | | | | |
|---|---|---|---|---|
| 2011/0110358 A1* | 5/2011 | Haartsen | ............... | H04J 3/0632 370/350 |
| 2012/0075072 A1* | 3/2012 | Pappu | .................. | H04B 5/0037 340/10.1 |
| 2012/0203076 A1* | 8/2012 | Fatta | ...................... | A61B 5/681 600/300 |
| 2014/0300490 A1* | 10/2014 | Kotz | .................... | A61B 5/0028 340/870.3 |
| 2016/0227484 A1* | 8/2016 | Park | ........................ | H04B 7/26 |

* cited by examiner

*Primary Examiner* — Duc C Ho
(74) *Attorney, Agent, or Firm* — RowanTELS LLC (57) ABSTRACT

An activity monitoring system comprising a plurality of wireless units wherein a first wireless unit comprises a wireless transceiver to broadcast at least one timing signal; a second wireless unit comprises: a wireless transceiver to receive at least one signal; a monitoring device that generates monitoring data; a memory to store the monitoring data; a processor to synchronize a time with the corresponding monitoring data; and wherein the second wireless unit: processes the received timing signal from the first wireless unit; synchronizes the monitoring data with the timing signal resulting in a time-synchronized data stream.

20 Claims, 11 Drawing Sheets

TOPOLOGY FOR A WIRELESS MODULAR NETWORK

CROSS-REFERENCE TO RELATED APPLICATIONS

This present disclosure claims the benefit of U.S. Provisional Application Ser. No. 61/887,334, filed on Oct. 4, 2013.

TECHNICAL FIELD

The present invention relates generally to a wireless modular network system. Specifically, the present invention relates to a distributed wireless multi-sensor network system and methods for time synchronization, collection, and post-processing of sensor data.

BRIEF BACKGROUND

Monitoring devices are becoming increasingly popular in many industries. This use has only increased with the proliferation of mobile devices such as smartphones. Many monitoring devices today provide the ability to couple or wirelessly connect with mobile devices to provide increased insight to a user. At the same time, device size and cost have significantly decreased, leading to smaller monitoring devices that may combine multiple types of sensors to collect data.

Multiple industries are being transformed by monitoring devices. One example of an industry that is being transformed by such technology is the health and fitness industry. Exercise and physical fitness are beneficial for many reasons, including improved health, increased life span, and for simply staying in shape. People exercise for many reasons, including reducing stress, staying active, or to reach new milestones such as running a mile faster than ever before. To get the maximum benefit from physical movement, a person needs to be able to quickly, accurately and simply receive information concerning their exercise. Thus in the health and fitness industry, such sensors are being used to analyze metrics such as a user's heart rate, body temperature, and various indicators of stress. In other areas of health science, sensors are being used to analyze a patient's sleeping patterns, breathing rates, and movement in the night, in order to determine if the patient is in deep sleep, or if the patient is suffering from some sort of disrupted sleep such as an apnea.

Another industry that is being transformed by such monitoring devices is the mobile video industry. Photographers and moviemakers are always finding new ways to affix cameras and/or video equipment on any number of moving bodies in order to monitor and capture events from multiple viewing angles like never before.

Currently available monitoring devices usually comprise of a single fixture with either a singular or multiple sensors. A simple example would be that of pedometers, and similar wearable devices, that can track and calculate how many steps a user has walked based off the sensor readings on an internal MEMS inertial sensor. A similar monitoring device can be implemented to track other activities depending on where they are placed, and what type of sensor is included in them. With the addition of more sensors these monitoring devices can gather multiple types of data in one unit. For example some modern devices, such as digital cameras, now come with both photo sensors and GPS sensors—such devices can simultaneously collect image data and while also noting GPS location data. Such devices thus allow users to not only recall what the image sensor saw but also recall where device was located when it captured the said image.

The aforementioned monitoring devices have specific limitations with respect to use and analytic ability. While such singular devices may provide multiple accurate data points they are naturally limited to only collecting data from a single location which is thus the data has limited analytical use—in fitness monitoring devices this is typically this the case because there is usually only one wearable piece. One solution is to have a system that incorporates a plurality of monitoring devices so that the system may generate more data points from multiple locations and thus provide greater analytical use (e.g. a monitoring device on each arm of a user to measure relative activity and balance). However setting up and initializing multiple monitoring devices are cumbersome for users and thus makes such an approach unpopular.

In addition, setting up such system is a nontrivial matter. Since the data sets collected from each of the monitoring devices would be in the form of a time series it is imperative that all of the incoming data thus be time correlated. It is not enough to simply rely on the internal clocks of each monitoring device as most practical timing devices (e.g. crystal oscillators) tend to drift about 40 microseconds/second thus rendering such internal clocks unusable after a mere few minutes. Current state of the art systems and methods do not disclose how to time synchronize a plurality of monitoring devices—in order to correlate useful data—without implementing a costly "absolute clock," such as a GPS, in each device. Presently available systems also fail to provide a method of automatically triggering all devices within a given topology.

Accordingly, there is a current and impending need for a system that can provide time synchronized data without requiring an absolute clock implemented in each monitoring device. There is also a need for a low-power system that can provide robust and highly accurate monitoring data that can be coupled with a mobile device for providing output regarding a given activity.

SUMMARY OF THE INVENTION

The present invention aims to solve these issues, and describes methods and systems for wirelessly connecting multiple "slave" monitoring devices in a star topology to a "master" device, which may itself be a monitoring device, or optionally a mobile device such as a smartphone, tablet, laptop, or any other device with a wireless connection. The present invention provides for efficient time synchronization that requires less resources and less power consumption at each monitoring device. The present invention also provides for data storage and time stamp to be locally present in each monitoring device. The present invention does not require communication with the master after connection is established or transmission of the first time synchronization packet.

BRIEF DESCRIPTION OF THE FIGURES

The invention is more fully appreciated in connection with the following detailed description taken in conjunction with the accompanying drawings, in which.

DETAILED DESCRIPTION OF THE INVENTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Sync Topology

Figure 1A:
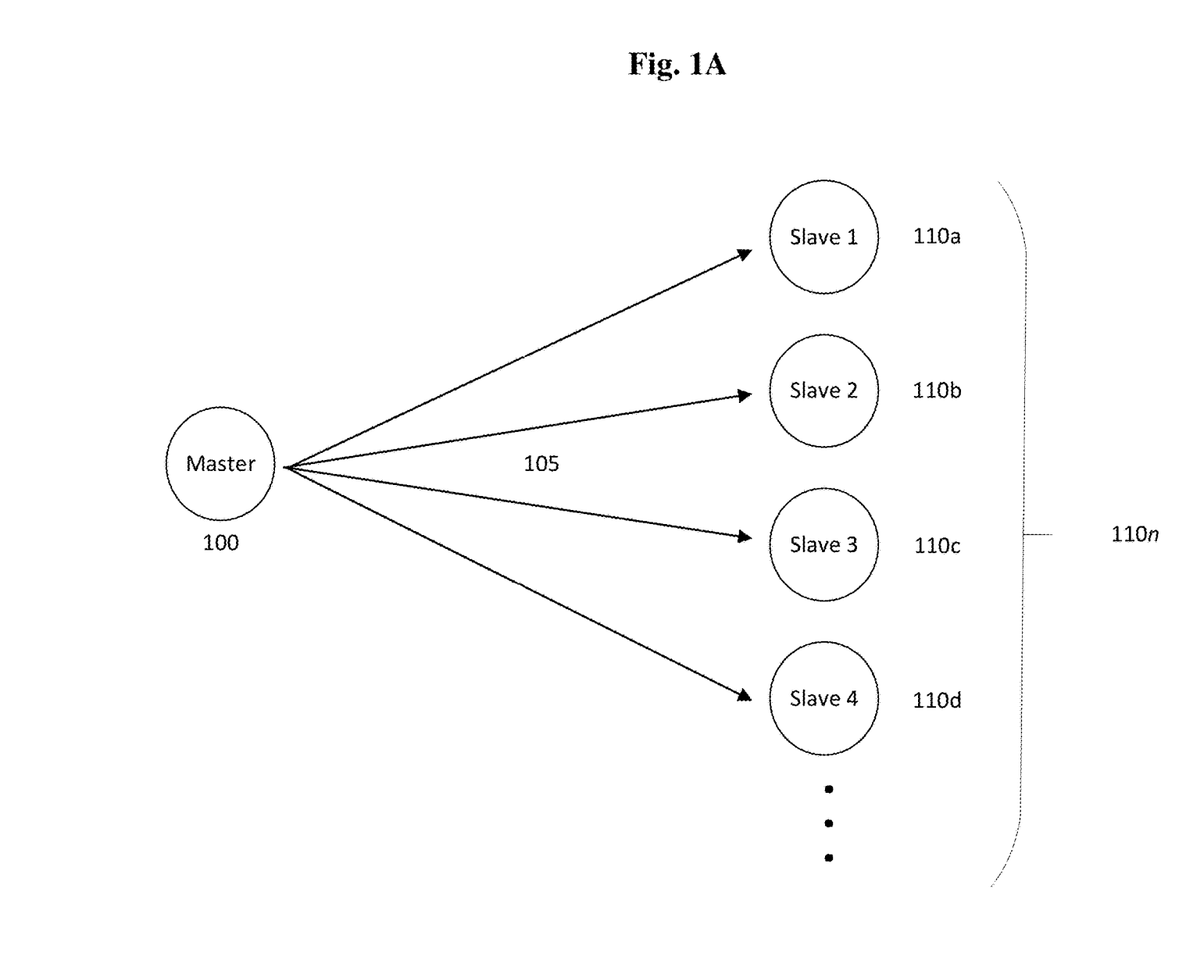
FIG. 1A illustrates the various units of a wireless system implemented in a star topology.

Specifically, in FIG. 1A, the present invention provides for multiple slave devices 110$a$-$d$ that are wirelessly coupled in a star topology to a master device 100. The slave devices 110$n$ are time-synchronized 105 to the master device 100 for real-time collection and correlation of sensor data. The purpose of the master device 100 is for time synchronization 105 and optionally for data collection from the multiple slave devices 110$n$ to the central master device 100. The sensor data may be wirelessly sent from at least one of the slave devices 110$n$ to the master device 100 in real-time, or stored locally on a slave device 110$n$ and then sent to a master device 100 at a later time.

Additionally in some applications it is advantageous to have one of the slave devices 110$n$ "wake up" the other devices when it detects a sensor reading beyond a certain threshold. In an example case there may be a user that has multiple motion sensors 400$n$ (that are paired in the star topology described in FIG. 1) on the user's body, as in FIG. 4. In such an example the movement of swinging ones left hand would first result in a significant sensor reading on 400$e$ and then, an instant later, a significant sensor reading on 400$b$, 400$c$, and perhaps even 400$a$. In such an applications this is useful because if one device 400$e$ has sensed a significant reading it is likely that the other devices 400$n$ need to be ready to sense significant readings as well—thus this would be an opportune time to ping the master device and sync the timing on all of the slave devices.

Figure 1B:
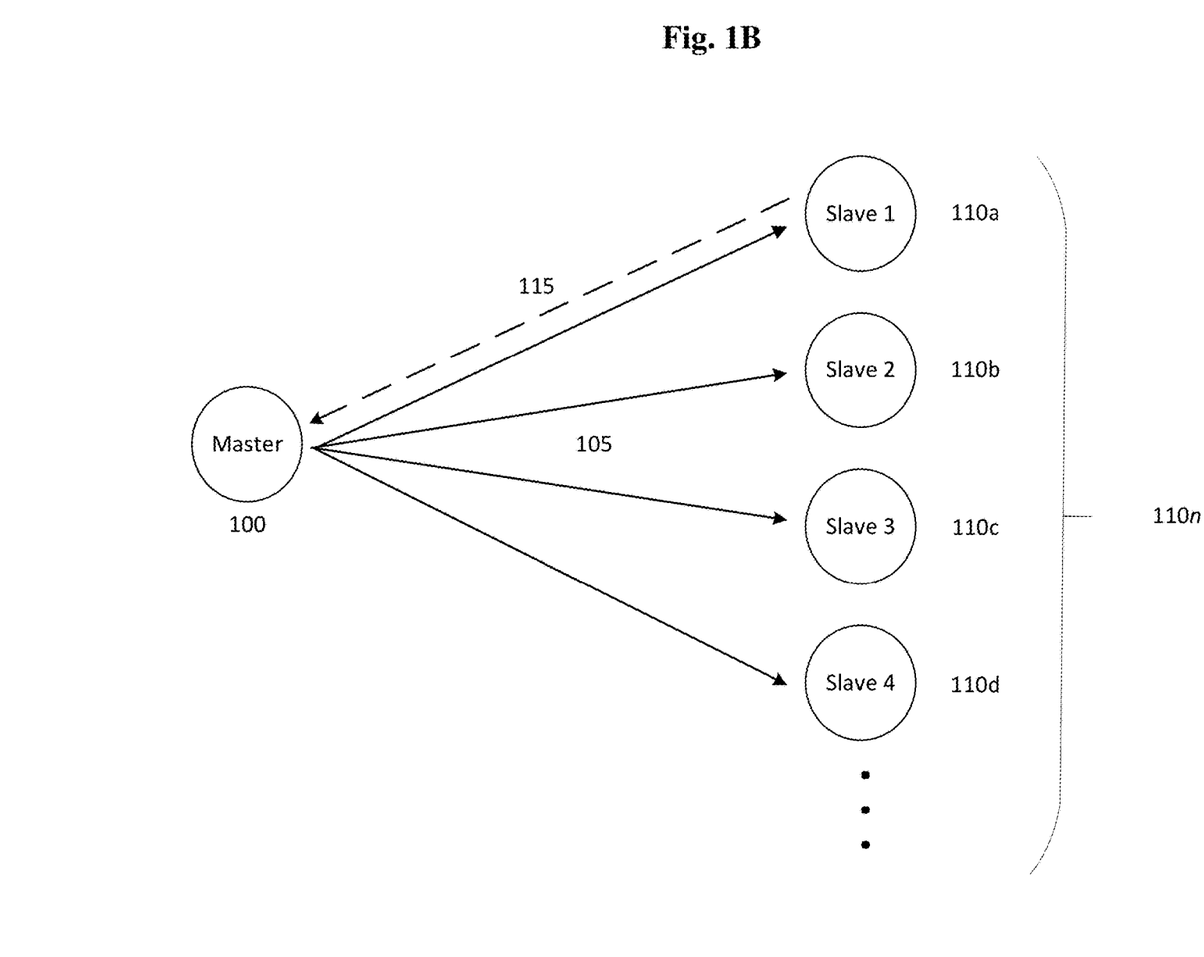
FIG. 1B illustrates a slave unit triggering a master unit of a wireless system implemented in a star topology.
Figure 9:
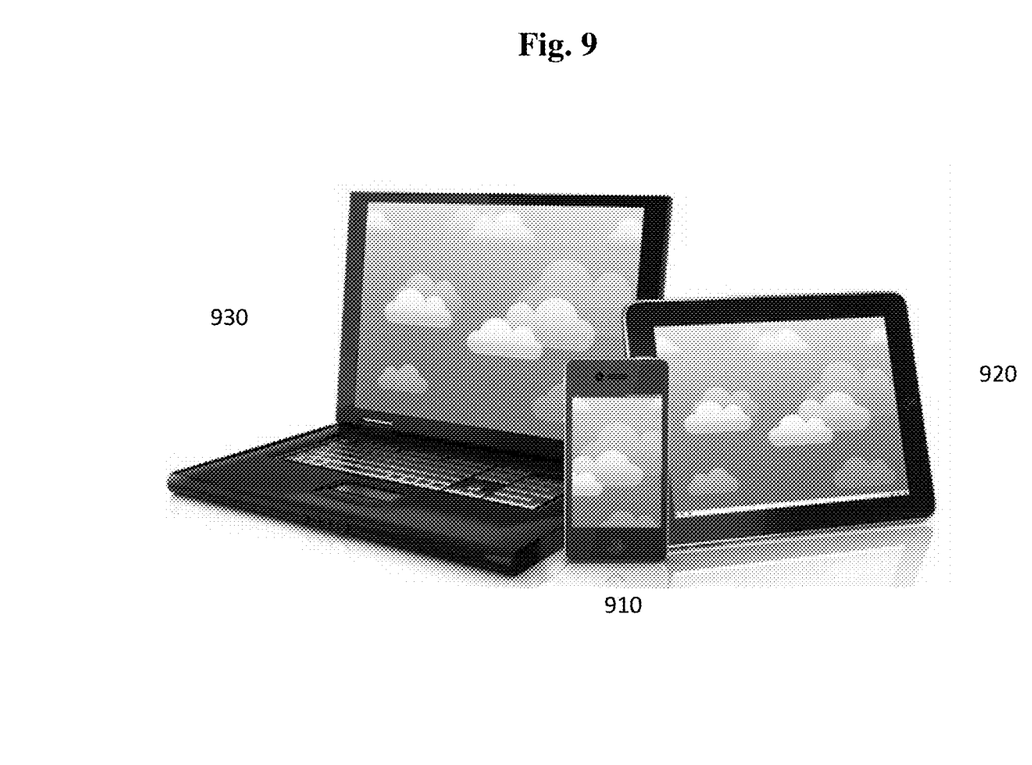
FIG. 9 illustrates an exemplary mobile device that may serve as a master device to multiple slave monitoring devices.

Notably, in FIG. 1B, synced data collection by the slave devices 110$n$ may be triggered by any slave device e.g. 110$a$ that transmits a trigger signal 115 to the master 100. The master 100 then responds with the time-stamp for synchronization 105 with multiple devices within the star topology. The master device 100 may simply be another sensor, or an external mobile device such as a smart phone 910, a tablet device 920, or a laptop computer 930 as shown in FIG. 9.

Such topology construction provides for a smart sensor network that requires less user intervention for use, and unlike the presently available systems, does not require each slave device 110 to be separately or physically engaged.

Wireless Protocol Implementation

Time-synchronization 105 can be achieved in several ways. In one embodiment time synchronization 105 can be achieved by an efficient use of the implicit messages and procedures inherent in wireless communications protocols.

Figure 2:
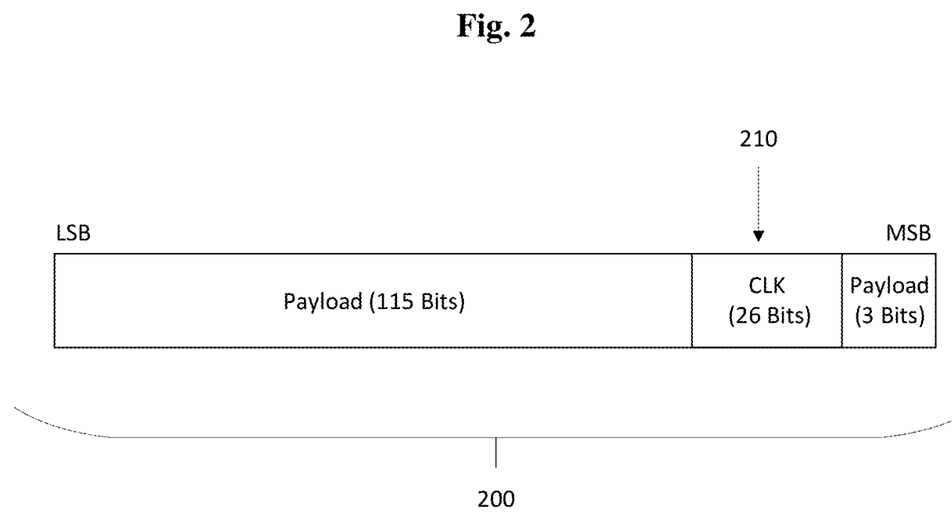
FIG. 2 illustrates the utilization of the CLK field of an FHS packet, in the classic Bluetooth protocol, for the purpose of communicating the master's clock timing to the slaves.

In one example, FIG. 2, utilizing the classic Bluetooth protocol, the master's 100 clock is communicated to the slaves 110$n$ via the CLK field 210 of an Frequency Hopping Synchronization (FHS) packet 200 and the slave 110$n$ is time synchronized to the master 100 during a connection establishment procedure.

The FHS packet 200 is a special control packet containing, among other things, the Bluetooth device address and the clock of the sender. The payload contains a total of 144 information bits plus 26 of which have clock information. The FHS packet is used in page master response, inquiry response and in role switch.

The FHS packet contains real-time clock information which is updated before each retransmission. The retransmission of the FHS payload is different than retransmissions of ordinary data payloads where the same payload is used for each retransmission. The FHS packet is used for frequency hop synchronization before the piconet channel has been established, or when an existing piconet changes to a new piconet.

The real-time clock information in the FHS packet is contained in the CLK 210 bits. This 26-bit field contains the value of the native clock of the device that sends the FHS packet, sampled at the beginning of the transmission of the access code of this FHS packet. This clock value has a resolution of 1.25 ms (two-slot interval). For each new transmission, this field is updated so that it accurately reflects the real-time clock value.

Figure 3:
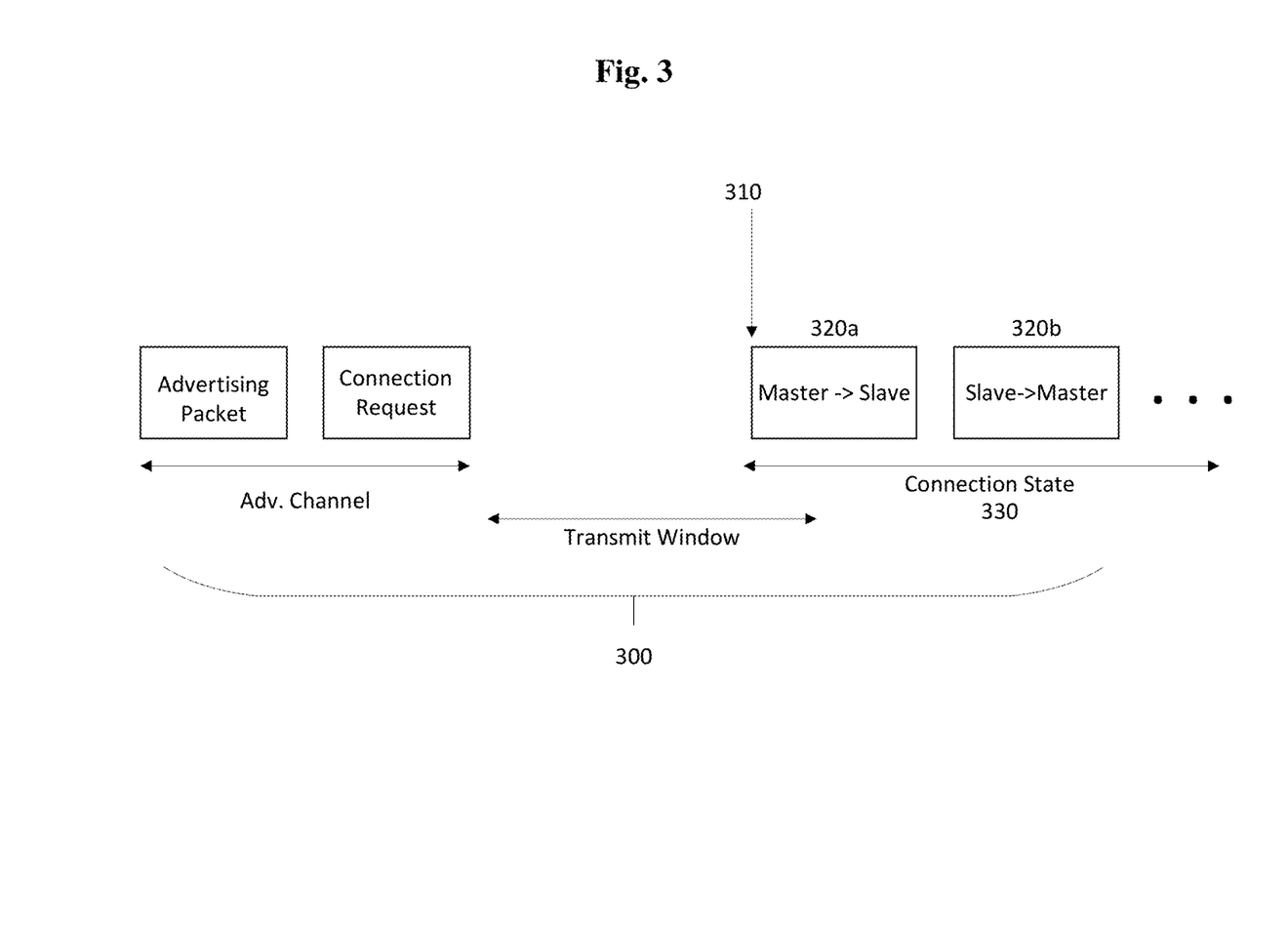
FIG. 3 illustrates the utilization of the timing instant of the anchor point in each connection event, in Bluetooth Low Energy, for the purpose of communicating the master's clock timing to the slaves.

Similarly, in another example, FIG. 3, utilizing the Bluetooth Low Energy (BLE) protocol, the timing of the master device 100 may be communicated to the slave device 110 via the timing instant of the anchor point 310 during each BLE connection event 300. In the cases of BLE implementations that do not require an explicit synchronized clock—as required in classic Bluetooth—such a "time sync" packet can be sent by the master device 100 with clock setting information for the slave device 110.

The first protocol data unit (PDU) 320$a$ sent, in the connection state 330, by the master determines the anchor point 310 for the first connection event 300, and therefore the timings of all future connection events in this connection. Thus once a slave is synchronized, no further "time sync" packets are needed unless synchronization is again needed to achieve a clock accuracy that cannot be maintained by the slave devices autonomously.

A major benefit of using such timing schemes is that it does not require each slave device 110 to have accurate absolute clocks (such as what is required in other time sensitive applications like GPS). Relative time as provided by a wireless protocol can be highly accurate. For example the classic Bluetooth protocol requires that the clock have a resolution of 312.5 us with a drift of +/−20 ppm. In BLE the timing accuracy within 2 us with a drift of +/−50 ppm.

This dual utilization of wireless protocols allows for space and power savings since additional circuitry for clock synchronization is not necessary. Such space saving is particularly useful in sensor network applications where it is often the case that such application require devices to fit into small form factors. Furthermore, by utilizing wireless protocols for synchronization sensors will require less energy and will consume less power resources thus improving battery life.

Sensor Data

Figure 6:
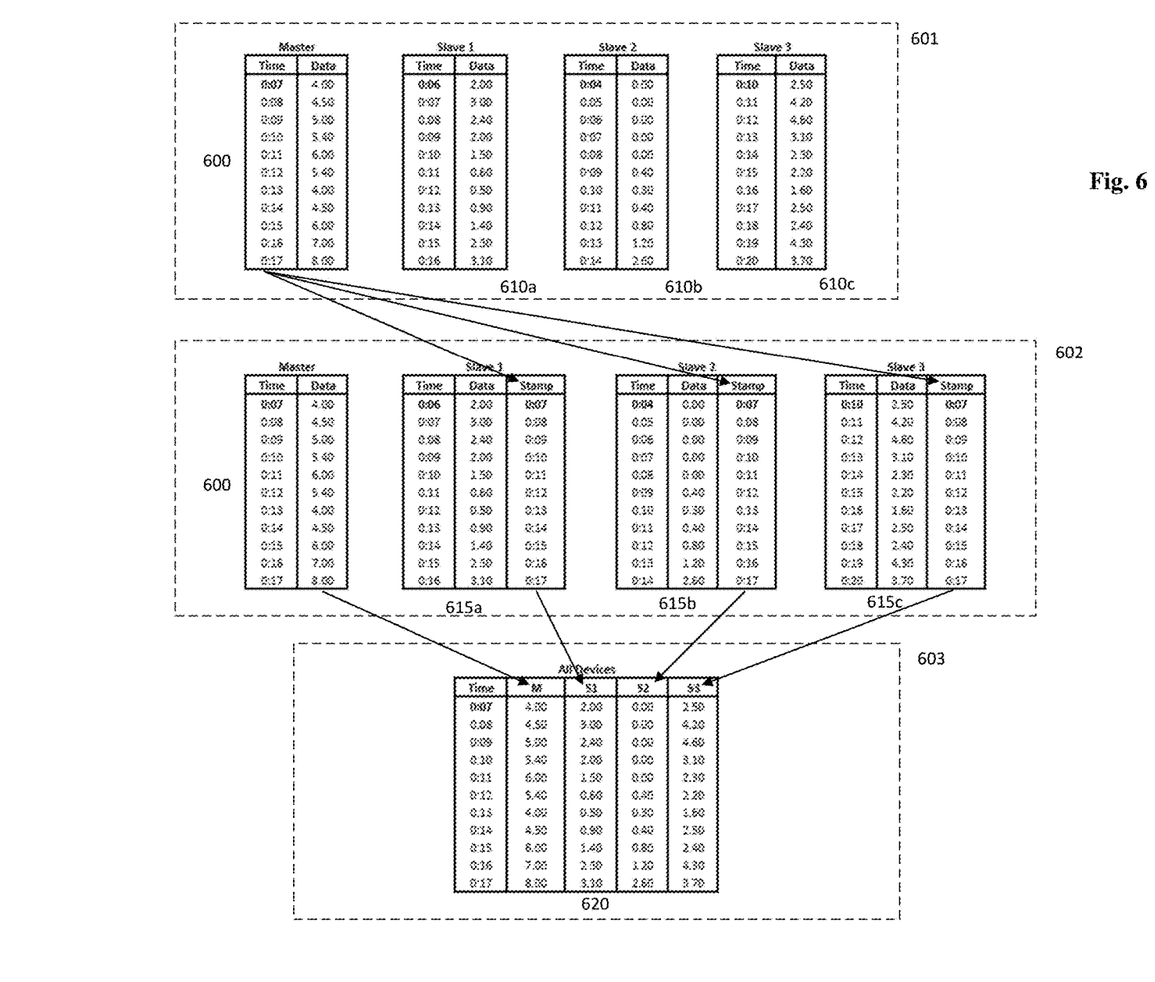
FIG. 6 illustrates multiple devices (1 master and 3 slave) recording concurrent data with asynchronous clocks. The 3 slave devices receive and store a time stamp from the master device. When the data from all of the devices come together the recorded data can be correlated using the common timestamp.

Each slave device 110 is autonomous and capable of locally storing recorded data and corresponding timestamps. No communication with the master device 100 is strictly needed after connection establishment or the first "time sync" packet. As shown in FIG. 6, in addition to time stamps, there can be additional annotations (or tags) to the stored data to specify the data type to facilitate subsequent time correlation, processing and presentation of the data.

Examples of such data types could include, but are not limited to, the following: sensor readings from an accelerometer, gyroscope, magnetometer, heart rate detector, temperature sensor; GPS coordinates: latitude/longitude; still image data, audio data, and motion picture data. Accordingly, each slave device may include one or more types of monitoring device. Monitoring devices within the slave devices could include, but are not limited to, multiple axis accelerometers, magnetometers, gyroscopes, photo sensors, microphones, and even pressure sensors. The present invention could utilize the data collected at each slave data to provide useful metrics to the user, including but not limited to the number of steps walked, distance traveled, elapsed time, number of calories burned and elevation.

Figure 7A:
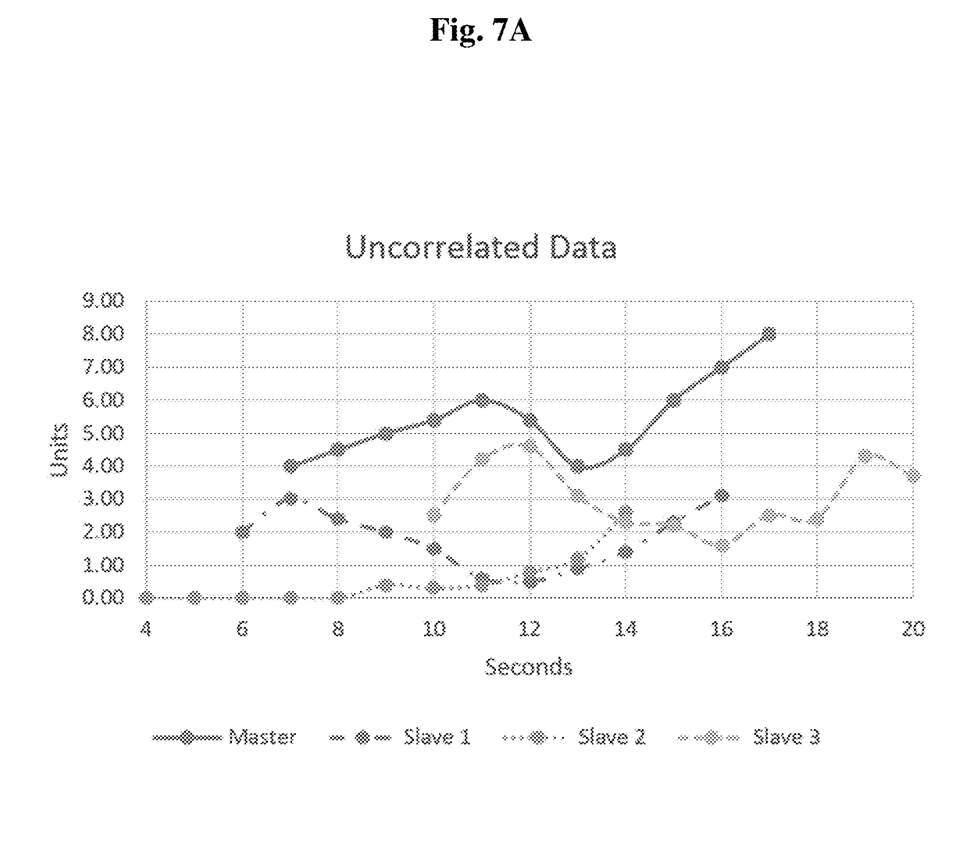
FIG. 7A further illustrates the mismatch between the data from the multiple devices.
Figure 7B:
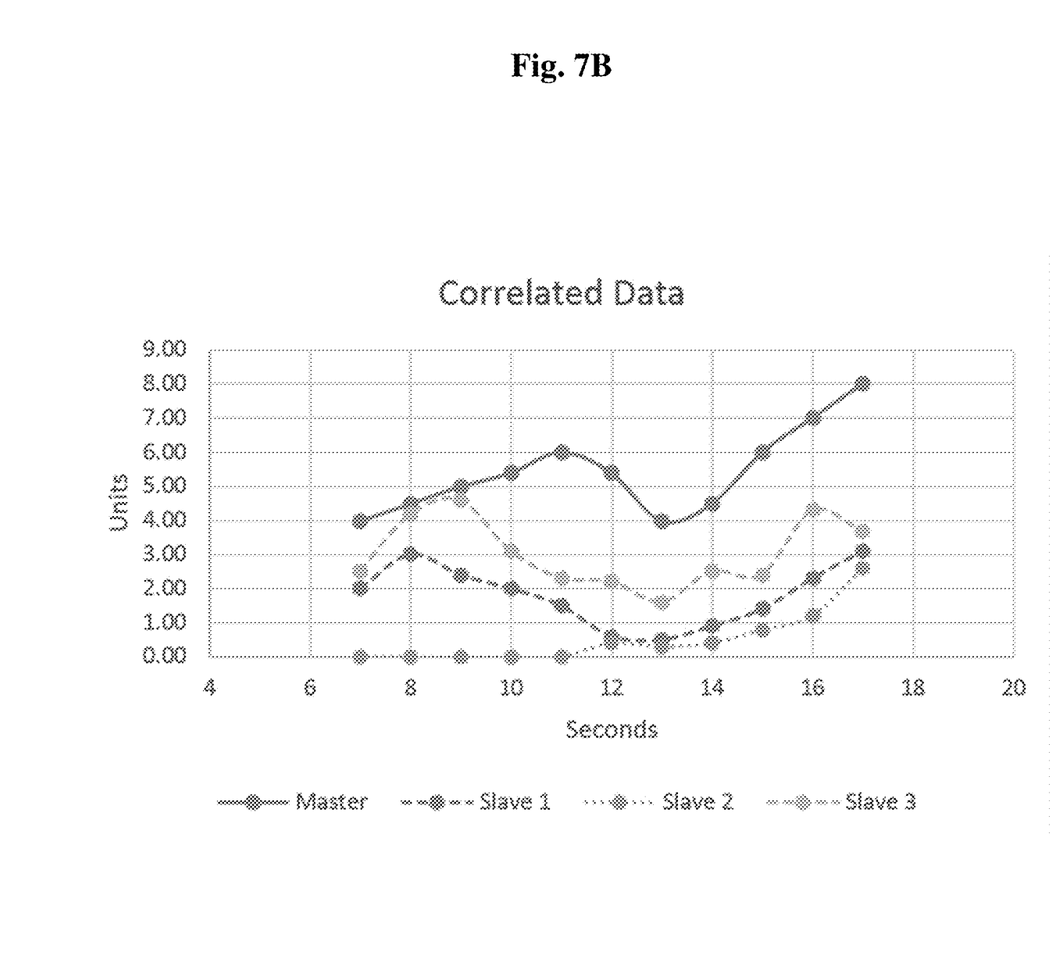
FIG. 7B illustrates the benefit of using a common time stamp.

As previously discussed, time synchronization is critical for correlating data from multiple devices with asynchronous clocks. For example, as depicted in FIG. 6, in a first step 601, one master device 600 and three slave devices 610abc may record ten seconds worth of concurrent data with asynchronous local clocks. As shown in FIG. 7A, data recorded in this manner would be impossible to analyze since the simultaneously recorded data would not align properly when plotted together thus rendering it useless. In a second step 602, in order to rectify this lack of correlation the three slave devices 610abc receive and store a time stamp from the master device 600. In the third step 603, when the data from all of the devices come together 620 the recorded data can be correlated using the common time-stamp. The benefit of using a common time stamp can thus be seen when the now correlated data from each device is plotted together, FIG. 7B.

In some cases data compression may be achieved by time-asynchronous, displacement-based sampling. Specifically, a displacement vector magnitude is accumulated, and only when a threshold is crossed will a sample be collected, together with a time-stamp. In one embodiment, the timing may be based on automatic time sync via a wireless protocol native timing such as the Bluetooth clock from the master in a Bluetooth piconet. The time-stamp may be the number of time samples are skipped since the last sample. This achieves the desired objectives of quantizing motion vectors evenly across 3 dimensional space, so that spatial resolution is maintained evenly with varying velocity.

To decrease power consumption, data preprocessing is performed by analog signal processing. The objective of motion sensors is to determine displacement vectors over time. Accordingly, the present invention provides for processing in the analog domain to generate estimates to allow sampling of sensed quantities, resulting in lower power consumption than sampling the various sensors directly and performing the equivalent DSP operations on the sampled data.

Applications

One of the key benefits of the present system is expandability. Currently available devices are used for single purpose computations, such as number of steps walked, or distance traveled. With the current system, other movements and events could be tracked, by expanding the number of slave 110 sensors linked to the master 100. For example, consider a user who goes to the gym to lift weights, and he would like to count how many repetitions he has lifted a weight, and what the pace is. The user could put multiple sensors on his arms to obtain these calculations and also obtain other metrics such as his heart rate and even the rate of blood flow.

Figure 4:
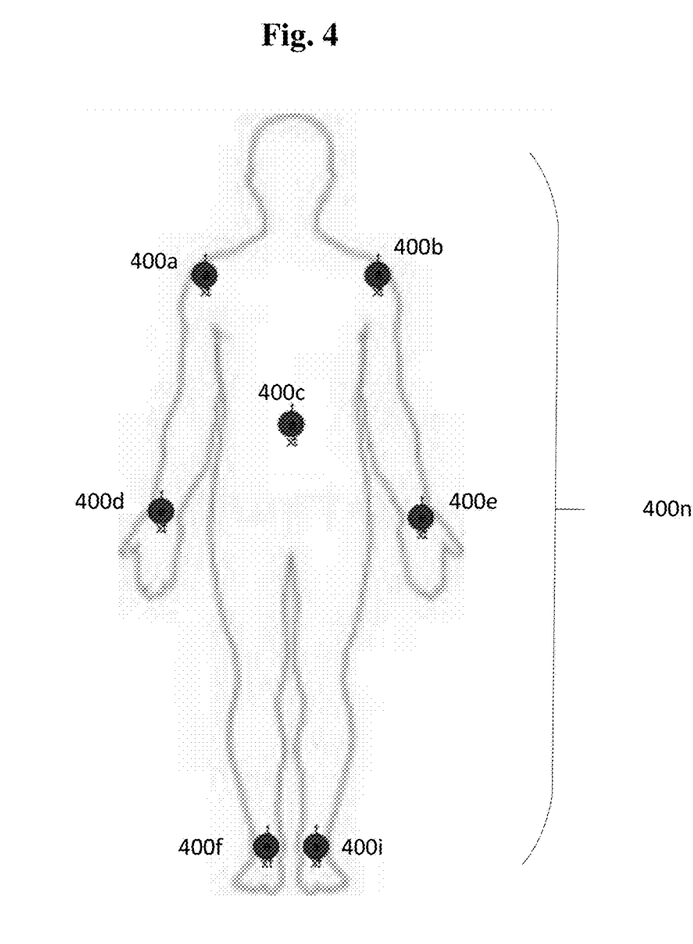
FIG. 4 illustrates sensors on various locations of a human subject to provide 3-D tracking of the body motions.

In one embodiment, FIG. 4, the slave devices 400 may be wearable. The slave devices 400 could be worn on various parts of the body to sense, track and store user activity data. The slave devices could be wearable by a clip, rubber strap, ring, or other attachable means depending on where on the body it is attached. Such arrangement could be used to provide 3-D tracking of body motions.

Figure 5:
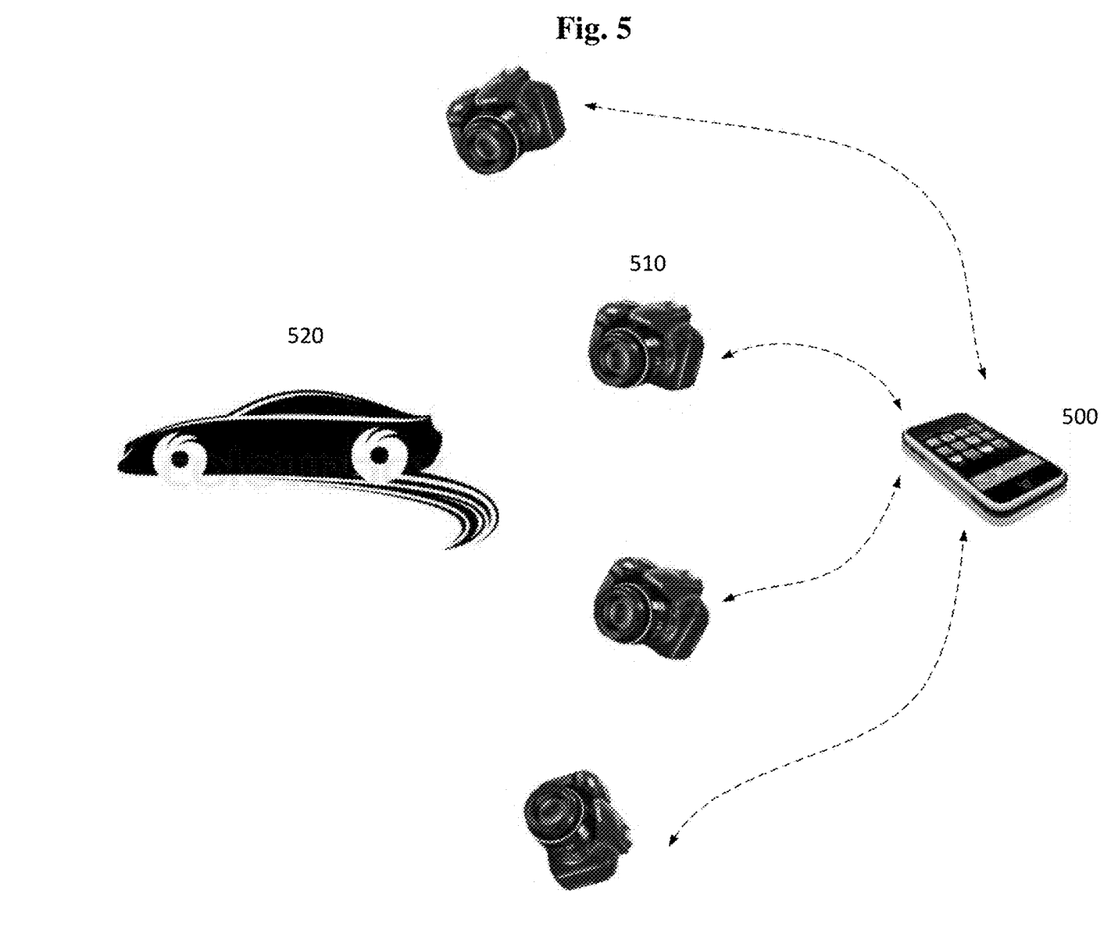
FIG. 5 illustrates multiple cameras taking videos of an event from different locations, with time synchronization provided by a phone as a master to provide multiple viewpoints to the event.

In another embodiment, FIG. 5, the slave devices 510 may be cameras or video recorders that are all time synchronized to collect data or pictures or video of an event 520. Such arrangement would provide multiple viewpoints to a particular scene or event 520. For example, such housings could be placed on multiple angles of a particular moving body, such as a vehicle.

In one embodiment, the slave devices may be pressure sensors that are placed on various portions of a diving-body, which can provide time-synced data regarding the pressure and or other useful statistics.

Figure 8:
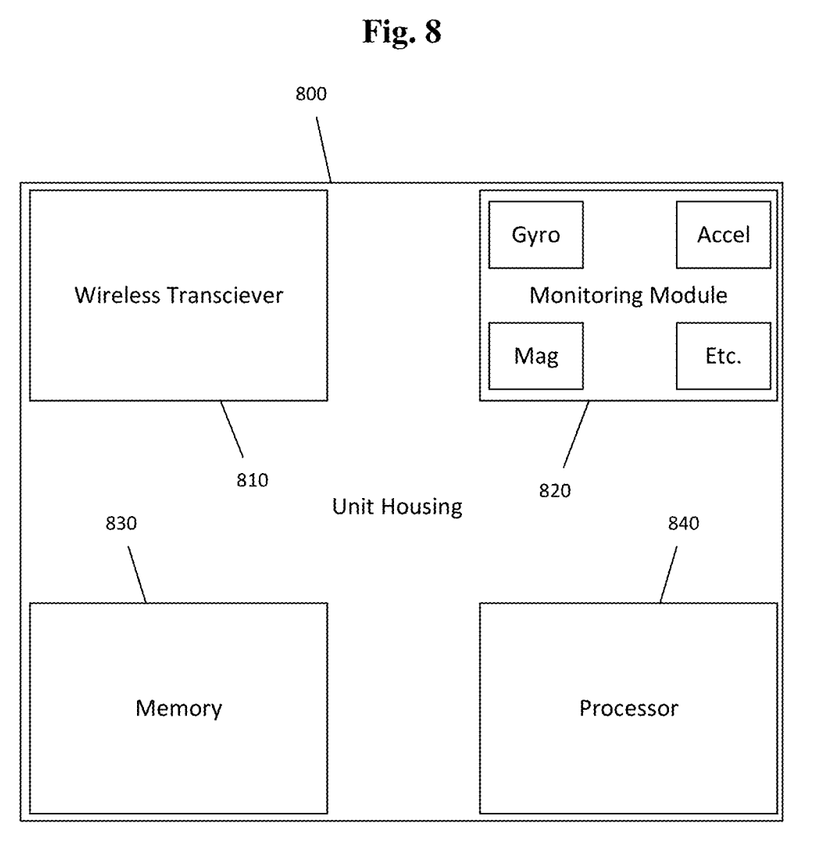
FIG. 8 illustrates a wireless unit housing and the multiple components and modules that exist within the housing.

FIG. 8 illustrates a wireless unit housing 800 and the multiple components and modules that exist within the housing. The wireless unit housing 800 may include a wireless transceiver 810, a monitoring module 820, a memory 830 and a processor 840. The monitoring module 820 may include a gyroscope, an accelerometer, a magnetometer, etc.

What is claimed is:
1. An activity monitoring system comprising:
a plurality of wireless units wherein
a first wireless unit comprising:
a wireless transceiver to broadcast at least one timing signal;
a second wireless unit comprising:
a wireless transceiver to receive the at least one timing signal;

an activity monitoring device that generates monitoring data;

a memory to store the monitoring data;

a processor to synchronize a timestamp from the second wireless unit with the corresponding generated monitoring data, thereby resulting in timestamped monitoring data; and wherein the second wireless unit:
processes the at least one received timing signal from the first wireless unit;
synchronizes the timestamped monitoring data with the at least one received timing signal resulting in a time-synchronized data stream that is time-synchronized with the first wireless unit.

2. The activity monitoring system of claim 1, wherein the activity monitoring device in the second wireless unit is a motion sensor.

3. The activity monitoring system of claim 1, wherein the activity monitoring device in the second wireless unit is a photo detector.

4. The activity monitoring system of claim 1, wherein the activity monitoring device in the second wireless unit is an infrared detector.

5. The activity monitoring system of claim 1, wherein the second wireless unit contains multiple and distinct activity monitoring devices.

6. The activity monitoring system of claim 1, wherein the first wireless unit is a mobile phone.

7. The activity monitoring system of claim 1, wherein the second wireless unit broadcasts a signal when the activity monitoring device receives monitoring data exceeding a threshold.

8. The activity monitoring system of claim 1, wherein the activity monitoring device in the second wireless unit creates a trigger signal that transmits a notification to the first wireless unit, in response to a sensor output that satisfies a predetermined trigger condition, wherein the sensor is located in the second wireless unit.

9. The activity monitoring system of claim 8 wherein the trigger signal results in all wireless units collecting monitoring data.

10. The activity monitoring system of claim 1, wherein the first wireless unit sends a message to one of the plurality of wireless units with timing information.

11. The activity monitoring system of claim 1, wherein the first wireless unit sends a time synchronization data packet to one of the plurality of wireless units.

12. The activity monitoring system of claim 1, wherein the monitoring data is compressed by time asynchronous displacement based sampling.

13. The activity monitoring system of claim 1, wherein the timing is based on a Bluetooth protocol.

14. The activity monitoring system of claim 1, wherein the timing is based on a Bluetooth Low Energy protocol.

15. A method for monitoring activity using a plurality of wireless units wherein a first wireless unit broadcasts at least one timing signal;

wherein a second wireless unit:
receives and processes the at least one timing signal from the first wireless unit;
generates and stores activity monitoring data;
synchronizes a timestamp from the second wireless unit with corresponding
generated activity monitoring data, thereby resulting in timestamped monitoring data; and
synchronizes the timestamped monitoring data with the at least one timing signal.

16. An activity monitoring system comprising a plurality of wireless devices, wherein a first wireless unit comprises:
a wireless transceiver to broadcast at least one timing signal;
a first mode providing unidirectional control over at least a second wireless unit;
a second mode wherein the first wireless unit may be controlled by any of a plurality of wireless devices within the activity monitoring system;
a local memory for data collection;
a wireless transceiver;
an activity monitoring device; and
wherein the first wireless unit can send and receive messages to one of the plurality of wireless units to start collecting data;
wherein a second wireless unit:
receives and processes the at least one timing signal from the first wireless unit;
generates and stores activity monitoring data from the activity monitoring device;
synchronizes a timestamp from the second wireless unit with corresponding generated activity monitoring data, thereby resulting in timestamped monitoring data; and
synchronizes the timestamped monitoring data with the at least one timing signal.

17. The activity monitoring system of claim 16, wherein the first wireless unit is a mobile phone.

18. The activity monitoring system of claim 16, wherein the first wireless unit comprises a plurality of Motion sensors.

19. The activity monitoring system of claim 16, wherein the second wireless unit broadcasts a signal when the activity monitoring device receives activity monitoring data exceeding a threshold.

20. The activity monitoring system of claim 16, wherein the activity monitoring device in the second wireless unit creates a trigger signal that transmits a notification to the first wireless unit, in response to a sensor output that satisfies a predetermined trigger condition, wherein the sensor is located in the second wireless unit.

* * * * *